US011272652B2

(12) United States Patent
King et al.

(10) Patent No.: US 11,272,652 B2
(45) Date of Patent: Mar. 15, 2022

(54) TURF AERATORS AND ASSEMBLIES FOR SAME

(71) Applicant: Briggs & Stratton, LLC, Wauwatosa, WI (US)

(72) Inventors: Brandon King, Pleasant Hill, MO (US); William Coates, Lee's Summit, MO (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 208 days.

(21) Appl. No.: 16/361,053

(22) Filed: Mar. 21, 2019

(65) Prior Publication Data

US 2019/0289766 A1   Sep. 26, 2019

Related U.S. Application Data

(60) Provisional application No. 62/646,937, filed on Mar. 23, 2018.

(51) Int. Cl.
 *A01B 45/02* (2006.01)

(52) U.S. Cl.
 CPC .................. *A01B 45/023* (2013.01)

(58) Field of Classification Search
 CPC ....... A01B 45/00; A01B 45/02; A01B 45/023; A01B 45/026
 See application file for complete search history.

(56) References Cited

U.S. PATENT DOCUMENTS

| 2,151,117 | A | * | 3/1939 | Kepler | A01B 63/045 |
| | | | | | 172/418 |
| 2,347,748 | A | * | 5/1944 | Melling | A01B 45/023 |
| | | | | | 172/21 |
| 2,638,831 | A | * | 5/1953 | Edwin | A01B 45/023 |
| | | | | | 172/22 |
| 3,429,378 | A | * | 2/1969 | Mascaro | A01B 45/023 |
| | | | | | 172/22 |
| 4,336,760 | A | * | 6/1982 | Cohen | A01B 45/026 |
| | | | | | 111/131 |
| 4,867,244 | A | * | 9/1989 | Cozine | A01B 45/023 |
| | | | | | 172/22 |
| 5,119,880 | A | * | 6/1992 | Zehrung, Jr. | A01B 45/026 |
| | | | | | 172/22 |
| 5,398,767 | A | * | 3/1995 | Warke | A01B 45/023 |
| | | | | | 172/125 |
| 6,892,821 | B2 | * | 5/2005 | Wessel | A01B 45/023 |
| | | | | | 172/22 |
| 7,341,114 | B2 | | 3/2008 | Classen et al. | |
| 7,669,667 | B2 | | 3/2010 | Petersen et al. | |

(Continued)

OTHER PUBLICATIONS

Billy Goat Turf Aerator Manual, 14 pages. (May 17, 2005).

*Primary Examiner* — Jamie L McGowan
(74) *Attorney, Agent, or Firm* — Foley & Lardner LLP

(57) ABSTRACT

A turf aerator includes a tine assembly and an input mechanism. The tine assembly includes multiple tines, a retractor plate for positioning the plurality of tines, and a linkage for selectively moving the retractor plate and the plurality of tines between an operating position and a retracted position. The input mechanism coupled to the linkage, the input mechanism operable to activate the linkage to move the retractor plate and the plurality of tines between the operating position and the retracted position.

12 Claims, 14 Drawing Sheets

(56) References Cited

U.S. PATENT DOCUMENTS

| | | |
|---|---|---|
| 7,971,653 B2 | 7/2011 | Harris, III |
| 8,255,126 B2 | 8/2012 | Hunt et al. |
| 8,291,991 B1 | 10/2012 | Cook |
| 8,757,283 B2 * | 6/2014 | Wessel ................. A01B 45/023 |
| | | 172/22 |
| 8,800,677 B2 | 8/2014 | Georgoulias et al. |
| 8,827,000 B2 | 9/2014 | Aldridge et al. |
| 8,844,645 B2 | 9/2014 | Hall et al. |
| 8,925,643 B2 | 1/2015 | Georgoulias et al. |
| 8,955,610 B1 | 2/2015 | Longmeyer |
| 9,462,738 B2 | 10/2016 | Bryant et al. |
| 9,510,497 B2 | 12/2016 | Zabel et al. |
| 9,924,623 B2 | 3/2018 | Georgoulias |
| 10,206,321 B2 | 2/2019 | Georgoulias et al. |
| 10,398,074 B2 | 9/2019 | Lapp et al. |
| 2011/0005783 A1 | 1/2011 | Livingstone |
| 2013/0248213 A1 * | 9/2013 | Wessel ................. A01B 45/023 |
| | | 172/22 |
| 2018/0153085 A1 * | 6/2018 | Smith ................. A01B 45/026 |

* cited by examiner

#

TURF AERATORS AND ASSEMBLIES FOR SAME

CROSS-REFERENCE TO RELATED PATENT APPLICATIONS

This application claims the benefit of U.S. Application No. 62/646,937, filed Mar. 23, 2018, which is incorporated herein by reference in its entirety.

FIELD OF THE INVENTION

Aerators are commonly used to improve turf quality by driving sets of coring tines into the ground to remove soil (often in cylindrical portions referred to as "plugs"). This counteracts soil compaction by creating cavities that permit water and other nutrients to better reach the roots of the remaining grass, and thereby promotes the overall health of the turf. Embodiments of the current disclosure advance the aerator art.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

In one embodiment, a turf aerator includes a tine assembly and an input mechanism. The tine assembly includes multiple tines, a retractor plate for positioning the plurality of tines, and a linkage for selectively moving the retractor plate and the plurality of tines between an operating position and a retracted position. The input mechanism coupled to the linkage, the input mechanism operable to activate the linkage to move the retractor plate and the plurality of tines between the operating position and the retracted position.

In another embodiment, a turf aerator includes a frame, a tine crank rotatably supported by the frame, a plurality of tines coupled to the tine crank, a swing arm rotatably supported by the frame, a retractor plate fixed to the swing arm, a linkage for selectively moving the retractor plate from an operating position to a retracted position, a keeper bar fixed to the swing arm, a latch, and an input. The tines pass through openings in the retractor plate, and a first end of the linkage terminates at a pedal. The latch is rotatably supported by the frame and engages the keeper bar when the retractor plate is at the retracted position, and the input is configured to selectively rotate the latch to disengage the keeper bar, thereby allowing the retractor plate to move from the retracted position to the operating position.

In another embodiment, a turf aerator includes a frame, a tine crank rotatably supported by the frame, a plurality of tines coupled to the tine crank, a pair of swing arms rotatably supported by the frame, a retractor plate fixed to the swing arms, a linkage for selectively moving the retractor plate from an operating position to a retracted position, a keeper bar fixed to the swing arms, a latch, and a cable. The tines pass through openings in the retractor plate, and a first end of the linkage terminates at a pedal. The latch is rotatably supported by the frame and engages the keeper bar when the retractor plate is at the retracted position. The cable is operable by a release handle and is configured to selectively rotate the latch to disengage the keeper bar, thereby allowing the retractor plate to move from the retracted position to the operating position.

DETAILED DESCRIPTION

Figure 1:
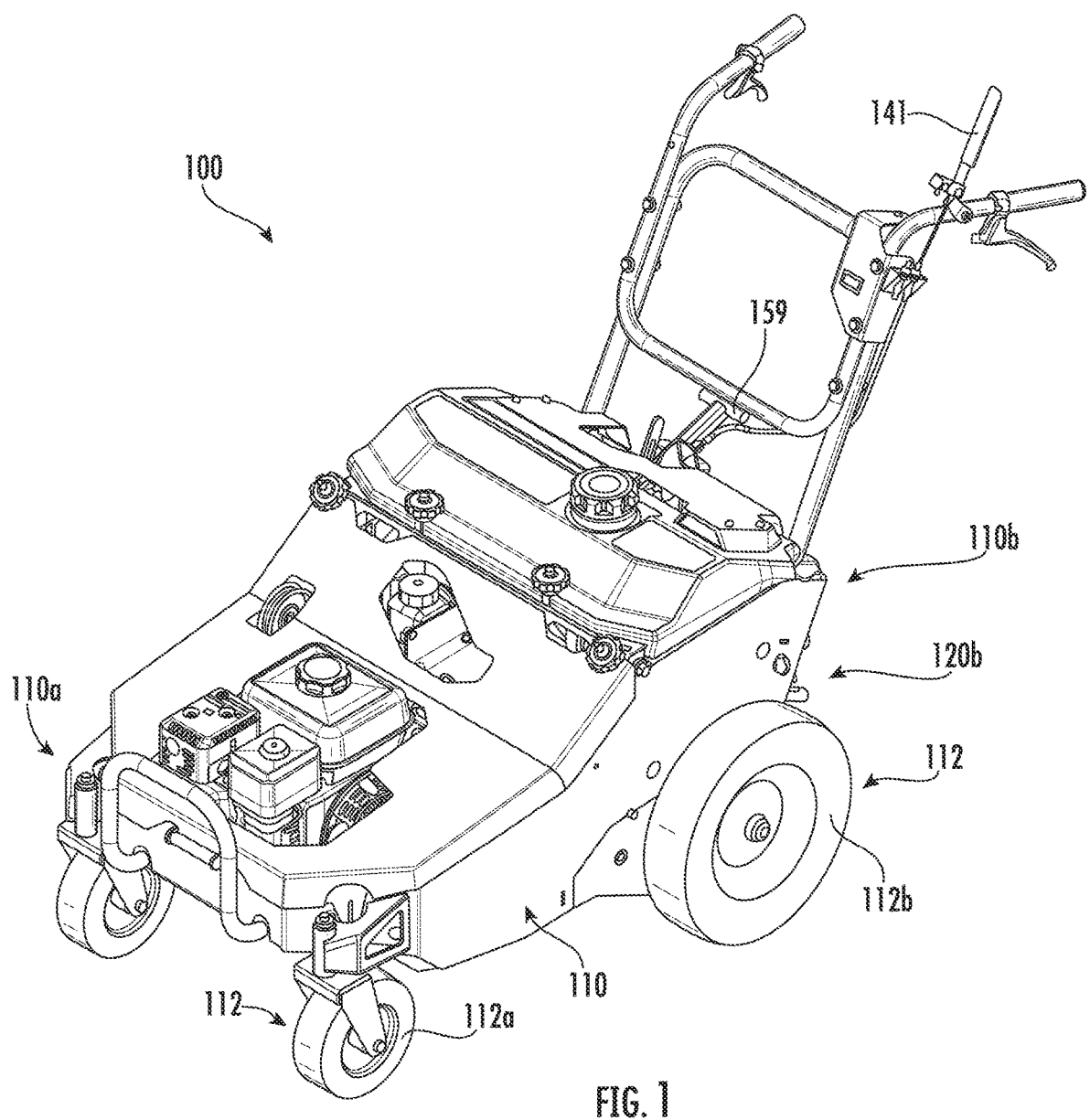
FIG. 1 is a perspective view of an aerator according to an exemplary embodiment of the current disclosure, shown with the tine assembly at a retracted position.
Figure 2A:
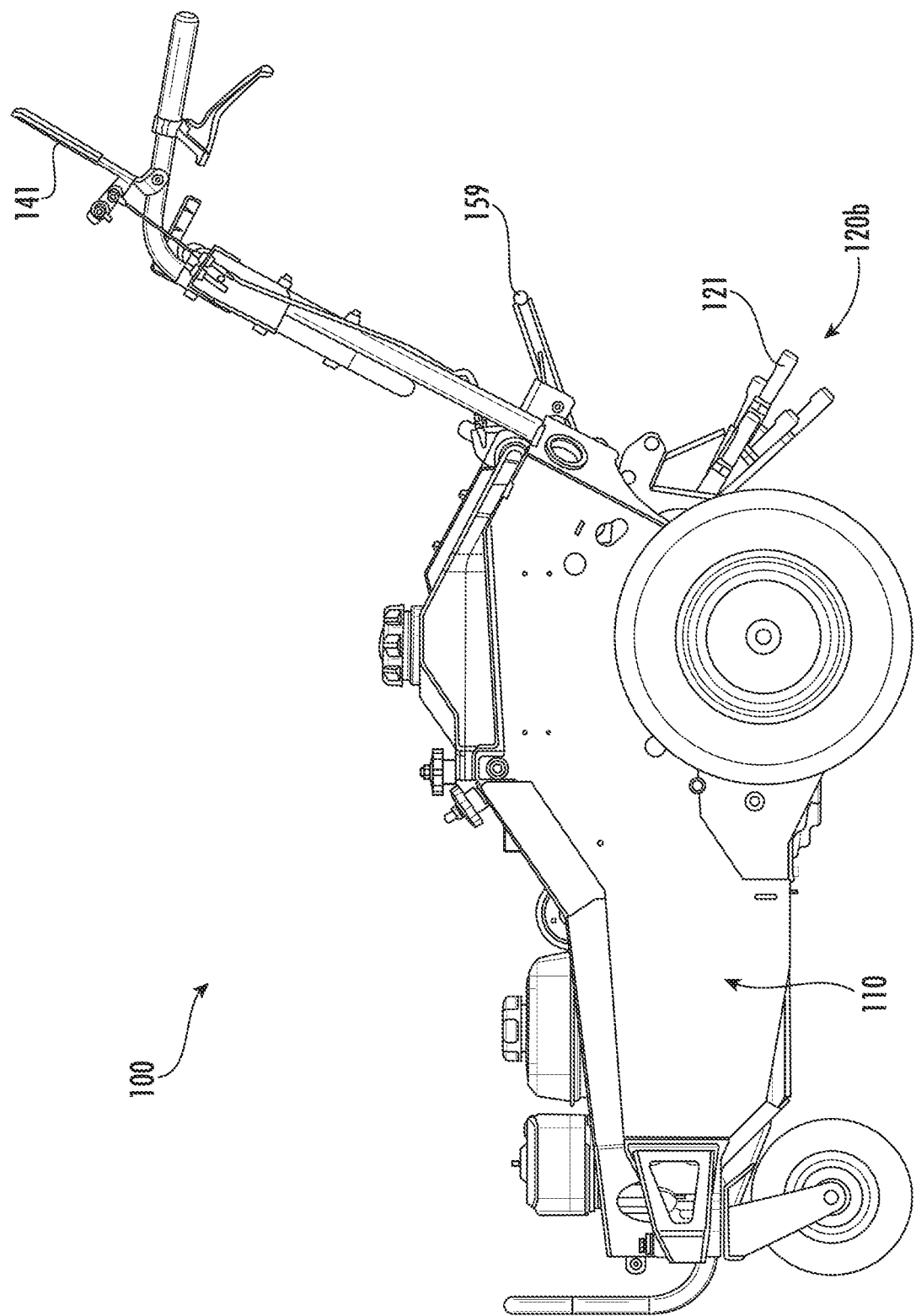
FIGS. 2A and 2B are opposite side views of the aerator of FIG. 1, shown with the tine assembly at the retracted position.
Figure 2B:
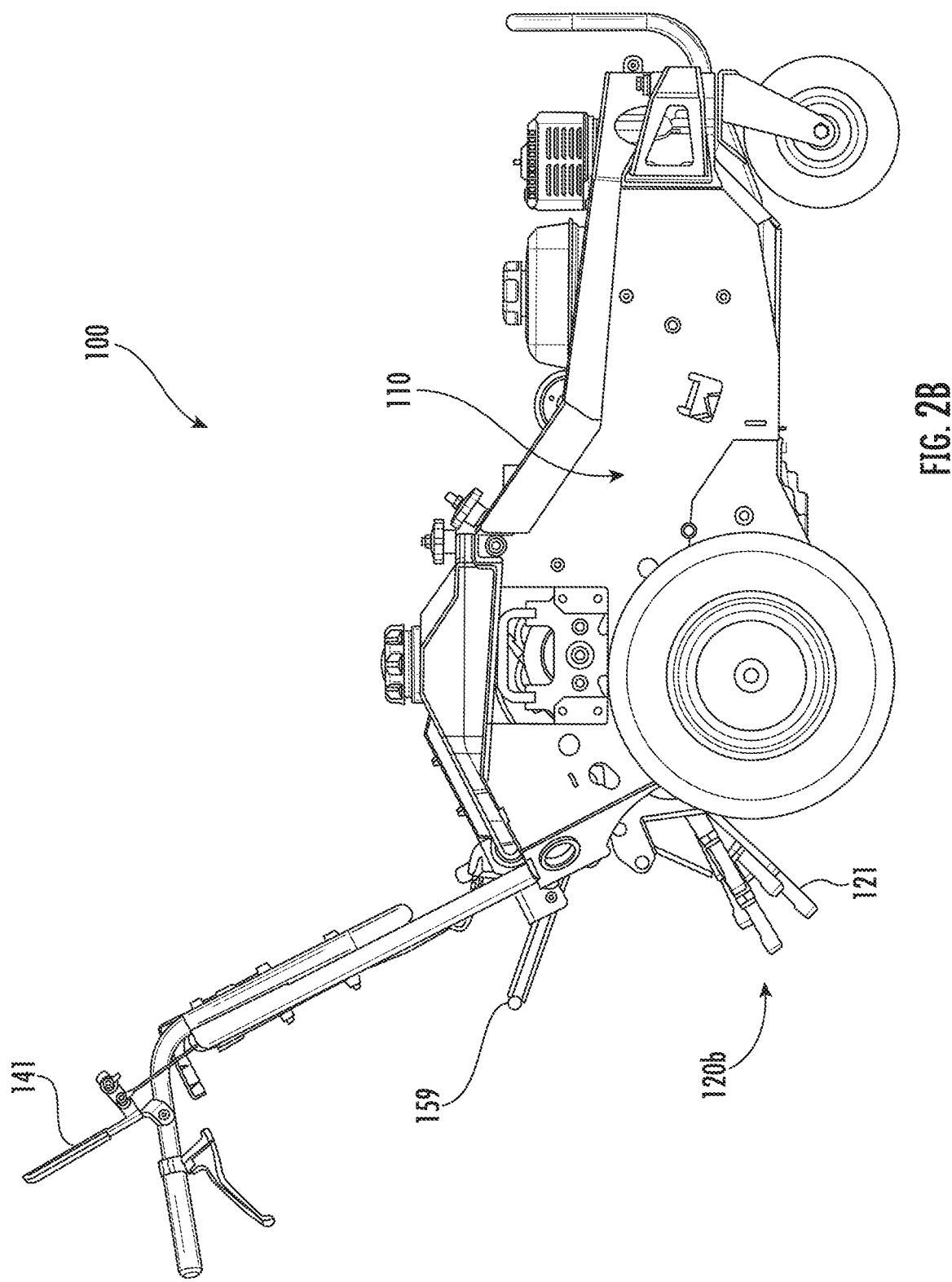
Figure 3:
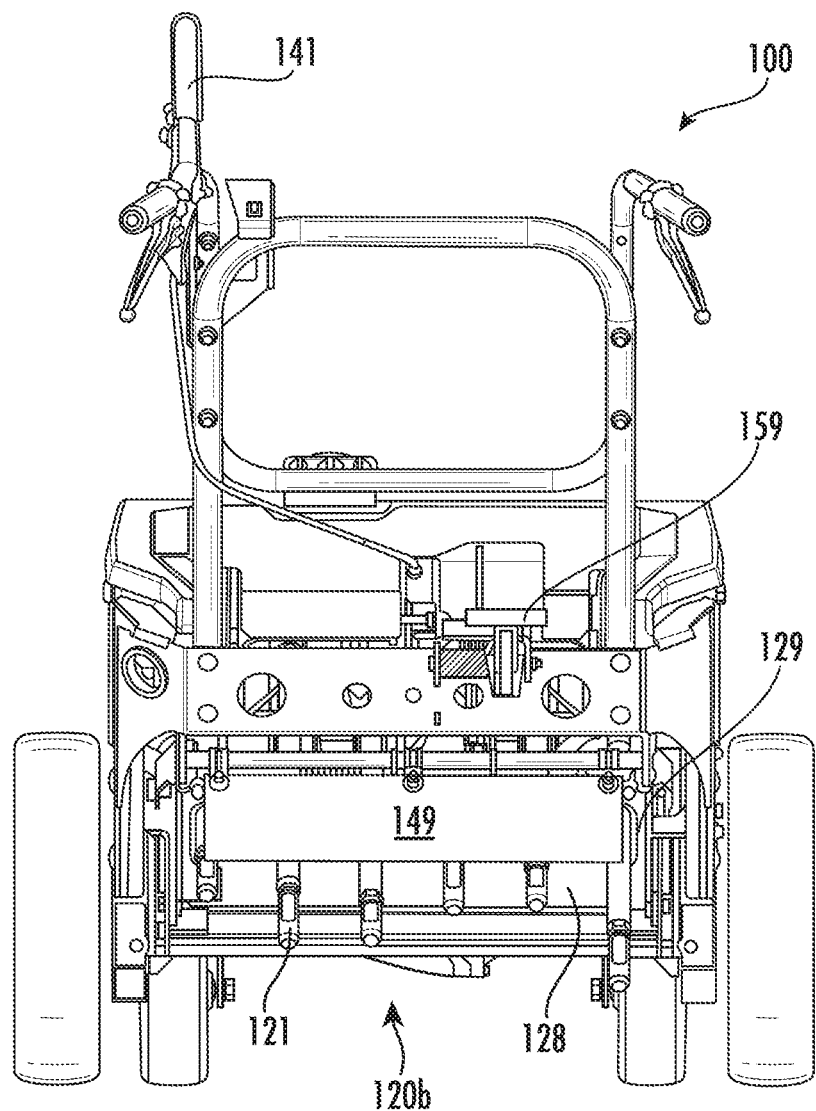
FIG. 3 is a rear view of the aerator of FIG. 1, shown with the tine assembly at the retracted position.
Figure 4:
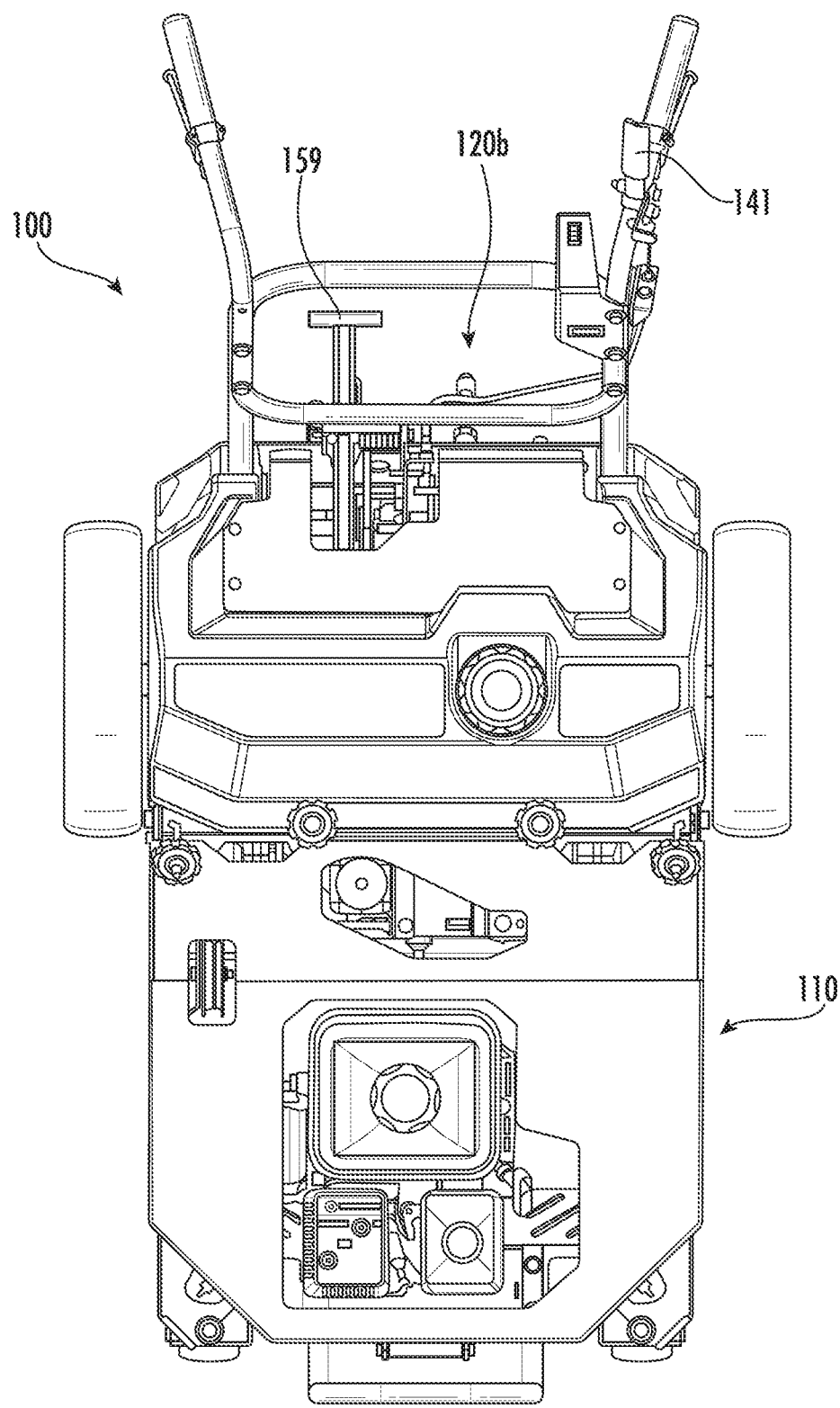
FIG. 4 is a top view of the aerator of FIG. 1, shown with the tine assembly at the retracted position.

Referring to the Figures generally, a turf aerator is shown, according to an exemplary embodiment. The turf aerator includes a tine assembly that is movable between an operating position, where tines perforate soil underneath the aerator, and a retracted position, in which the tines do not perforate the soil. To move the tine assembly between the operating position and the retracted position, an operator can use single motions, with either one hand or one foot engaging with a component of the aerator. In addition, the linkages between an operator interface and the components of the aerator are more rigid in nature, as compared to cables or other flexible linkages that may be used on conventional aerators. In this way, the operation of the aerator is simplified for the operator, and breakages of components, such as cables or other linkages, may be reduced or eliminated.

FIGS. 1 through 8C show a turf aerator according to one embodiment 100 of the current disclosure. The aerator 100 includes a frame 110 with front and rear ends 110a, 110b and a plurality of wheels 112 operatively coupled to the frame 110. Two front wheels 112a and two rear wheels 112b are shown in the drawings, though more or fewer wheels 112 may be included. As is known in the art, the wheels 112 may be powered by an engine or motor, hydraulically, et cetera.

A retracting tine assembly 120, best shown in FIGS. 5 through 8A, is movable between an operating position 120a at which tines 122 of the tine assembly 120 may be used to perforate soil with small holes and a retracted position 120b at which the tines 122 will not intersect the ground. The tine assembly 120 broadly includes a tine crank 121 rotatably supported by the frame 110, a plurality of the tines 122 coupled to the tine crank 121, a pair of retractor plate swing arms 125, a retractor plate 128 for positioning the tines 122, a keeper bar 131, a latch 135, an input mechanism, such as a release handle 141, release cable 143, linkage 151, and another input mechanism, such as a pedal 159.

As known in the art, the tine crank 121 (FIGS. 6B, 7A, and 8A) may be powered (i.e., rotated) by a belt and pulley or chain and sprocket powered by an engine or motor, by a hydraulic motor, battery pack(s) of a variety of different chemistries, such as lithium-ion, nickel cadmium, lead acid, nickel-metal hydride, et cetera, or otherwise as currently known or later developed. And the tines 122 may be any desired aerating tines, whether now know or later developed, which may be coupled to and operated by the tine crank 121.

Figure 5:
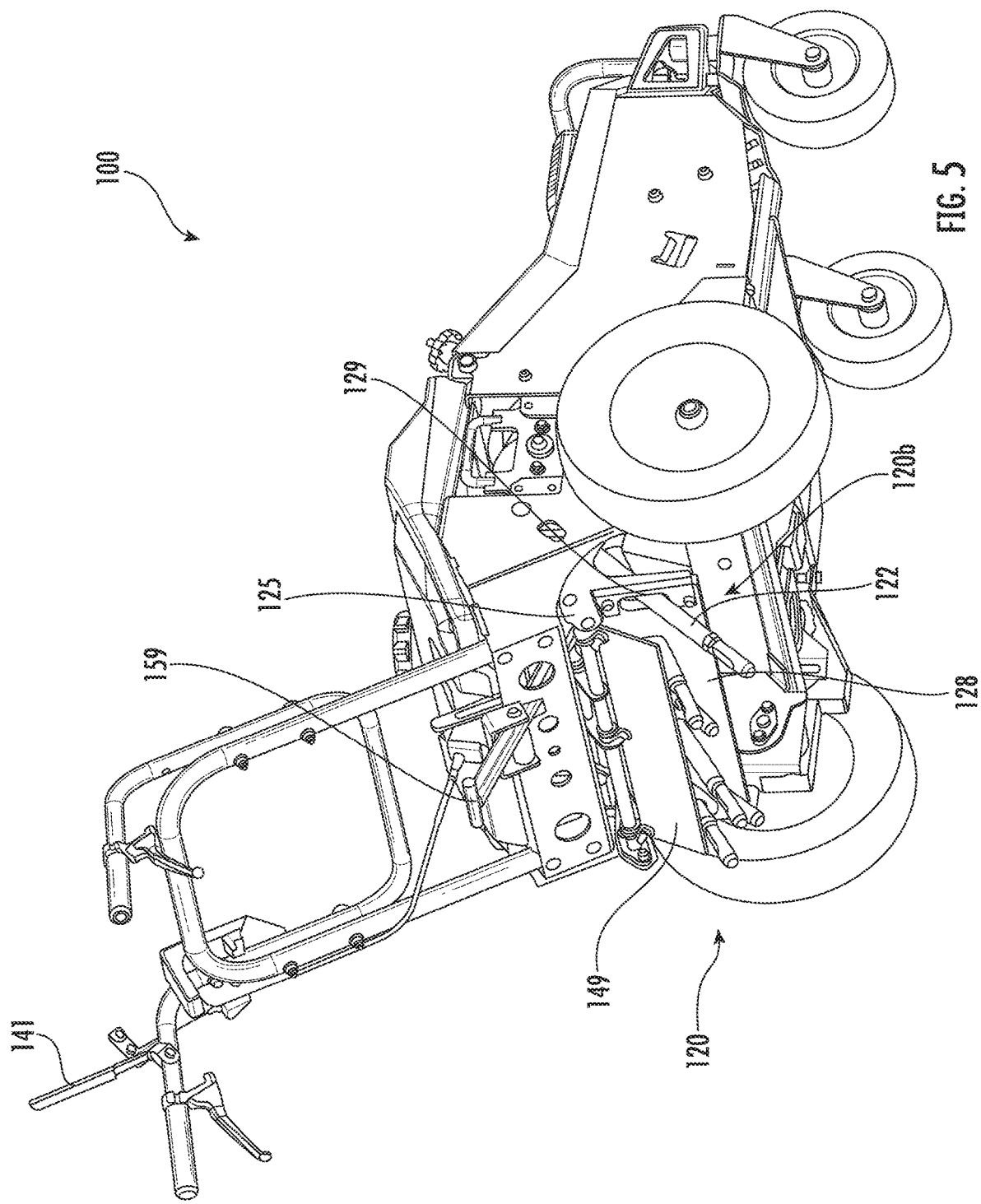
FIG. 5 is another perspective view of the aerator of FIG. 1, shown with the tine assembly at the retracted position.
Figure 6A:
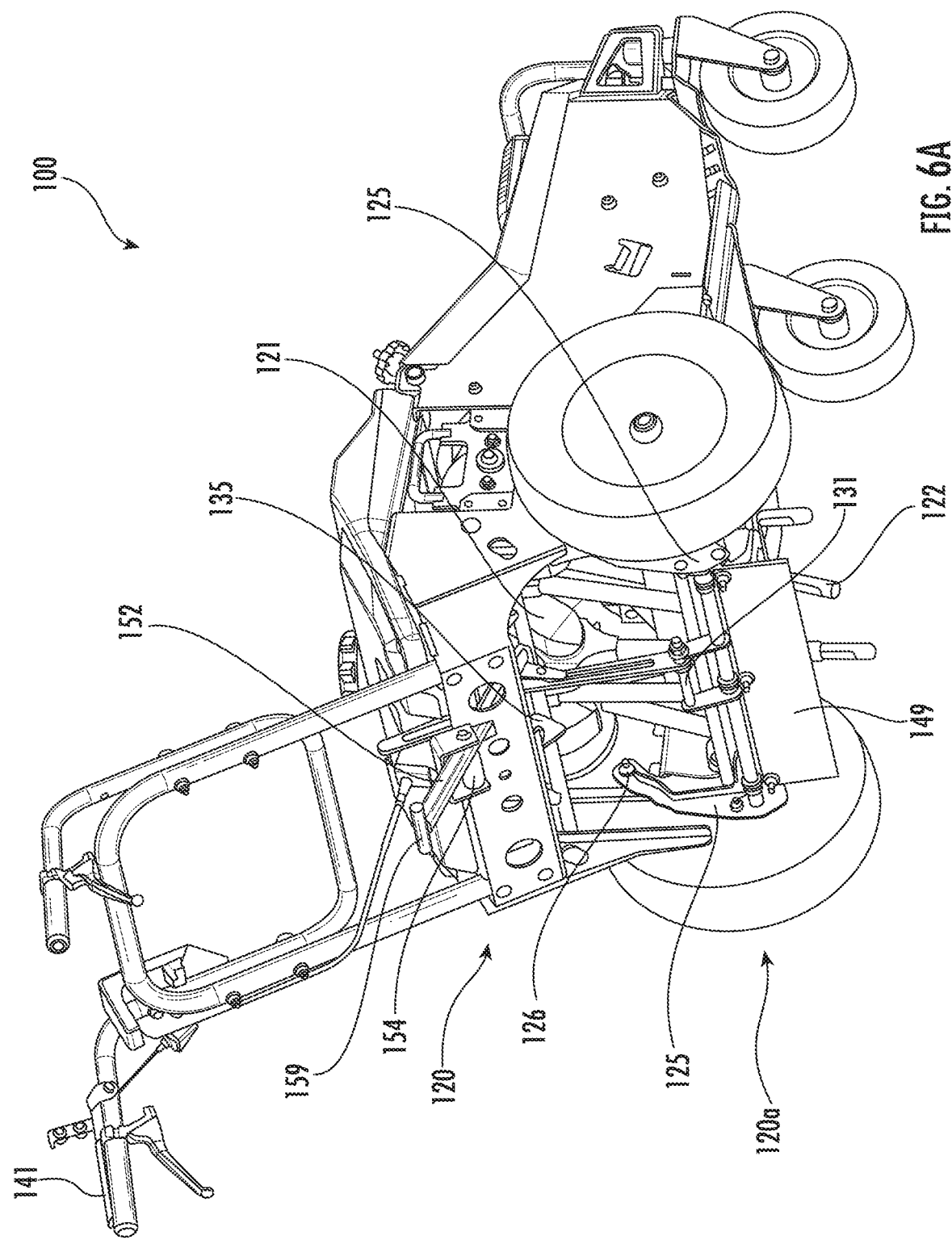
FIGS. 6A and 6B are perspective views of the aerator of FIG. 1, shown with the tine assembly at an operating position.
Figure 6B:
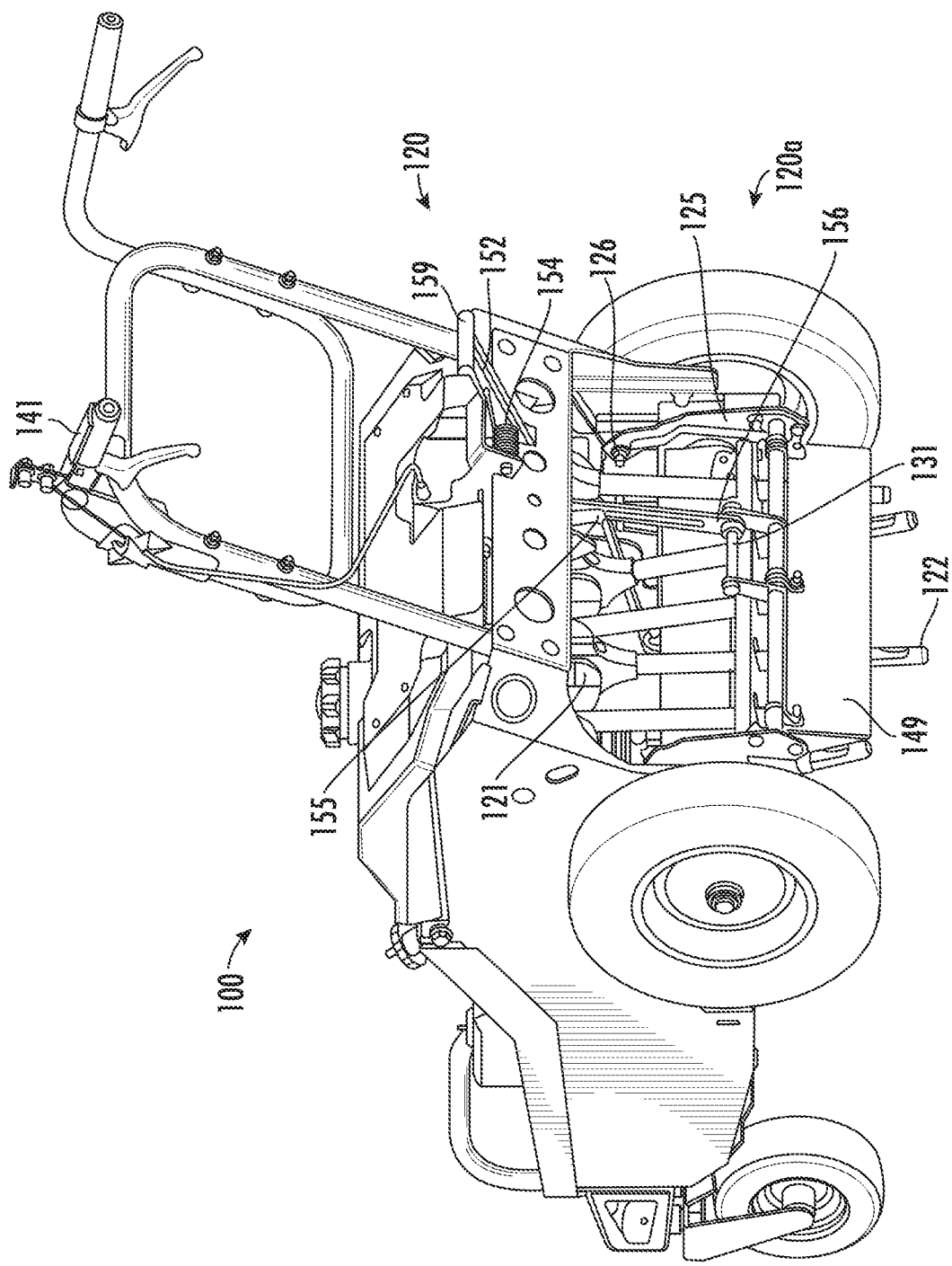

The pair of retractor plate swing arms 125 are rotatably supported by the frame 110 at pivot points 126 located at opposite sides of the frame 110 (see FIGS. 6A and 6B). The retractor plate 128 is fixed (directly or indirectly) to the swing arms 125 and defines a plurality of openings 129 (FIG. 7A) through which the tines 122 pass. The location of the retractor plate 128 determines whether the tine assembly 120 is at the operating position 120a or the retracted position 120b. More specifically, when the retractor plate 128 is relatively horizontal as shown in FIG. 6B (the operating position 120a), the retractor plate 128 guides the tines 122 to move toward and away from the ground as the tine crank 121 rotates; and when the retractor plate 128 is relatively vertical as shown in FIG. 5 (the retracted position 120b), the retractor plate 128 supports the tines 122 such that the tines 122 cannot interact with the ground. The retractor plate 128 includes slots through which the tines 122 move to contact the ground when in the operating position 120a. The retractor plate 128 can also control how fast the aerator 100 moves in the forward direction, while also simultaneously helping to propel the aerator 100 in the direction of movement. When at the operating position 120a, the tines 122 are generally located between the rear wheels 112b and preferably do not extend rearwardly beyond the rear wheels 112b; and when at the retracted position 120b, at least some of the tines 122 preferably extend rearwardly of the rear wheels 112b.

Figure 7A:
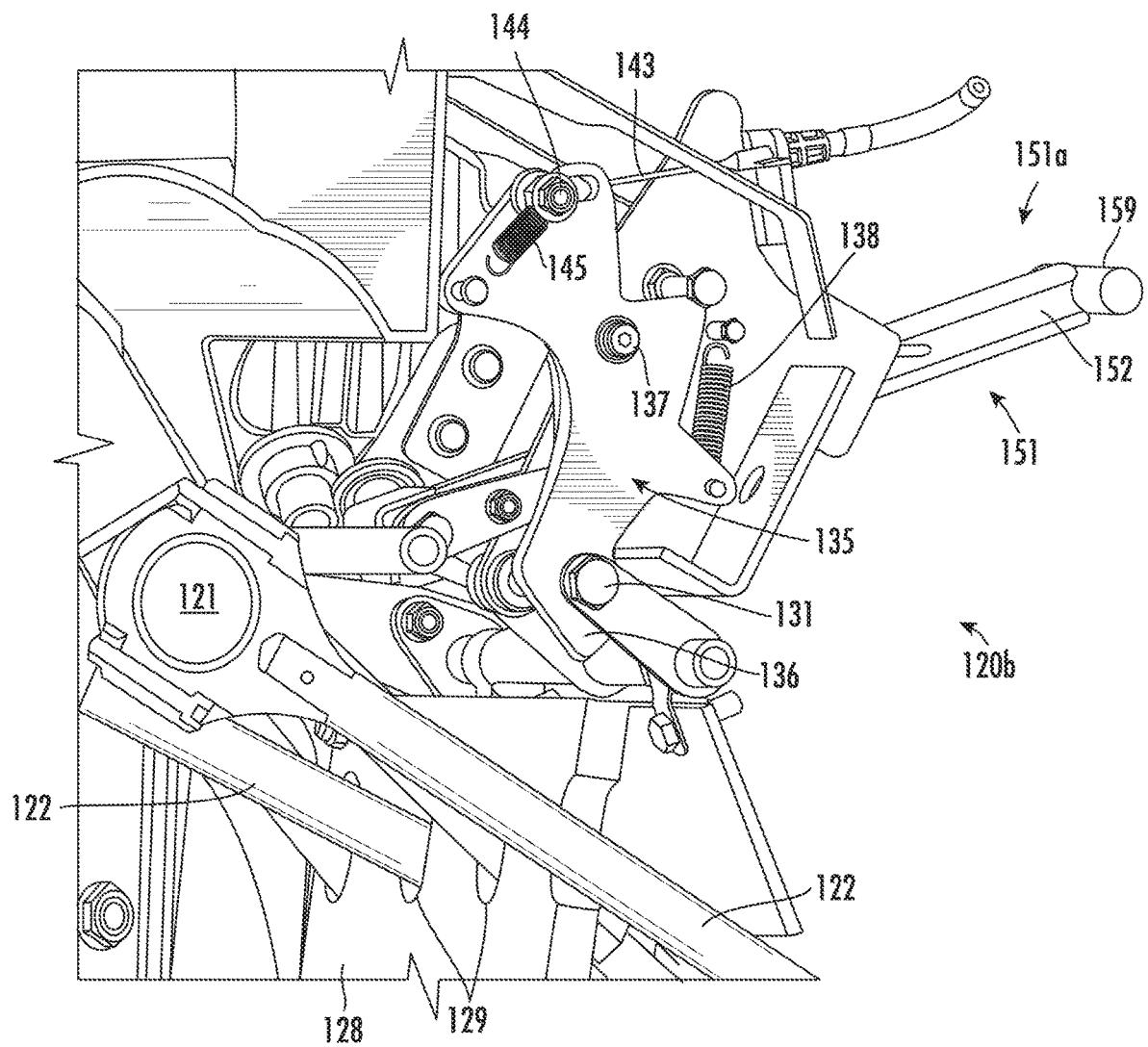
FIGS. 7A, 7B, and 7C are partial views of the aerator of FIG. 1, shown with the tine assembly at the retracted position.
Figure 7B:
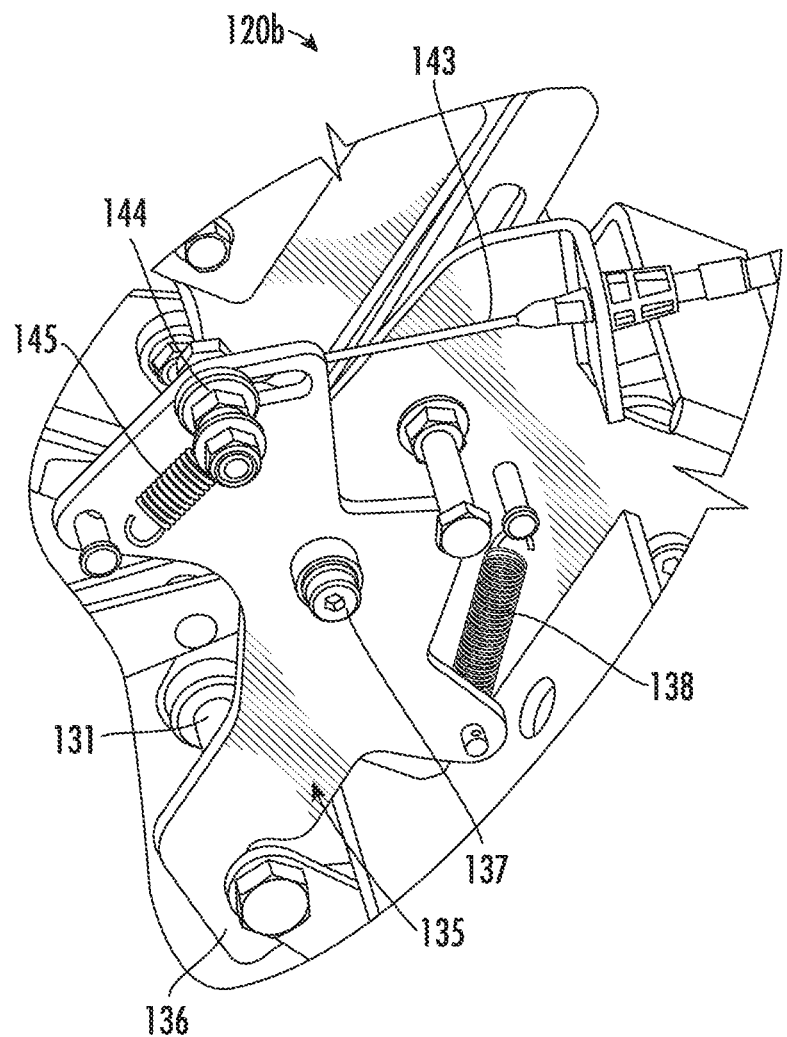
Figure 7C:
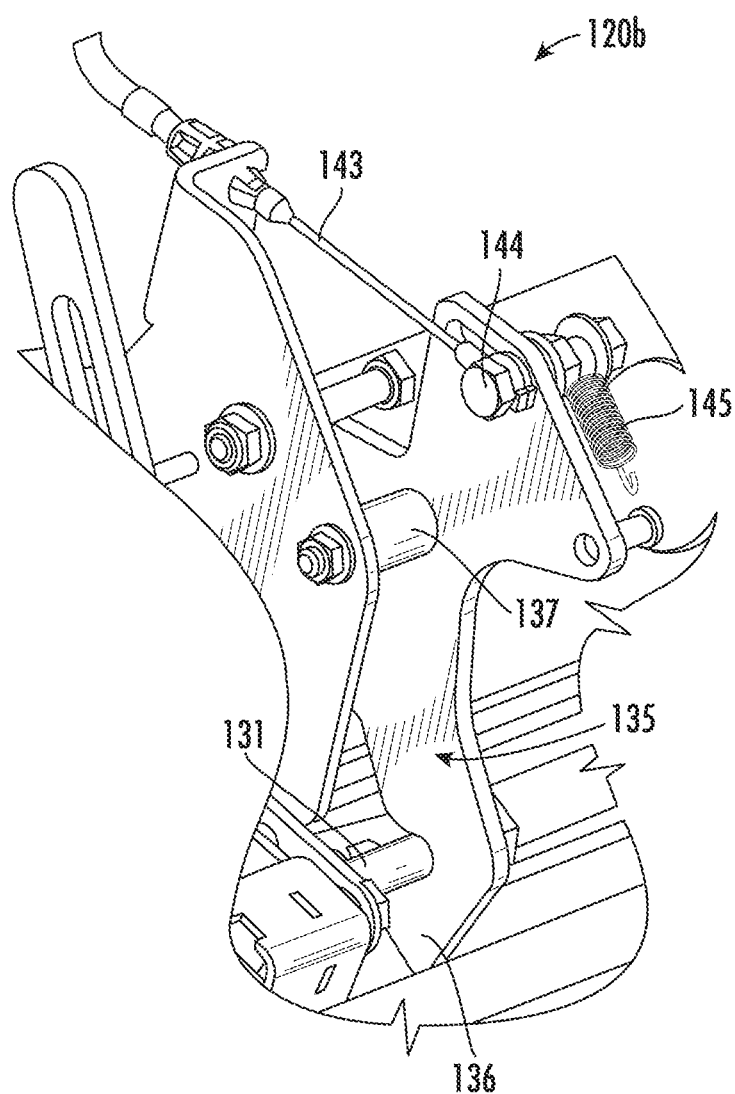

The keeper bar 131 engages with the latch 135 to maintain the tine assembly 120 at the retracted position 120b. The keeper bar 131 is fixed relative to the swing arms 125 and may extend directly from one or both swing arms 125 or otherwise be attached to structure extending from one or both swing arms 125 (such as shown in FIGS. 6A and 6B, for example). As shown in FIGS. 7A through 7C, a hook portion 136 of the latch 135 interacts with the keeper bar 131 to maintain the retractor plate 128 relatively vertical.

The latch 135 is rotatably coupled to the frame 110 at pivot point 137 and is biased to hold the keeper bar 131 by a spring 138 (e.g., a mechanical spring, gas spring, hydraulic spring, et cetera), as shown in FIGS. 7A and 7B. And the input mechanism or release handle 141 (FIG. 1) interacts with the latch 135 through the release cable 143, as best illustrated in FIGS. 7A through 8C. More particularly, one end of the cable 143 is coupled to the handle 141 and another end of the cable 143 terminates at a striker 144. A spring 145 biases the striker 144 in a direction that that does not urge the hook portion 136 to disengage the keeper bar 131. Yet sufficient input from the release handle 141 to the cable 143 causes the striker 144 to overcome the force of the spring 145 (and the force of the spring 138), rotating the latch 135 about the pivot point 137 and releasing the keeper bar 131 from the hook portion 136. With the keeper bar 131 released from the hook portion 136, gravity causes the retractor plate 128 to move to be relatively horizontal (and thus the swing arms 125 to rotate about the pivot points 126), such that the tine assembly 120 is at the operating position 120a. A shield 149 may be rotatably supported (directly or indirectly) by at least one of the swing arms 125 so that the shield 149 lowers to provide a buffer between the tines 122 and the operator when the tine assembly 120 is at the operating position 120a, as shown in FIG. 6B.

Figure 8A:
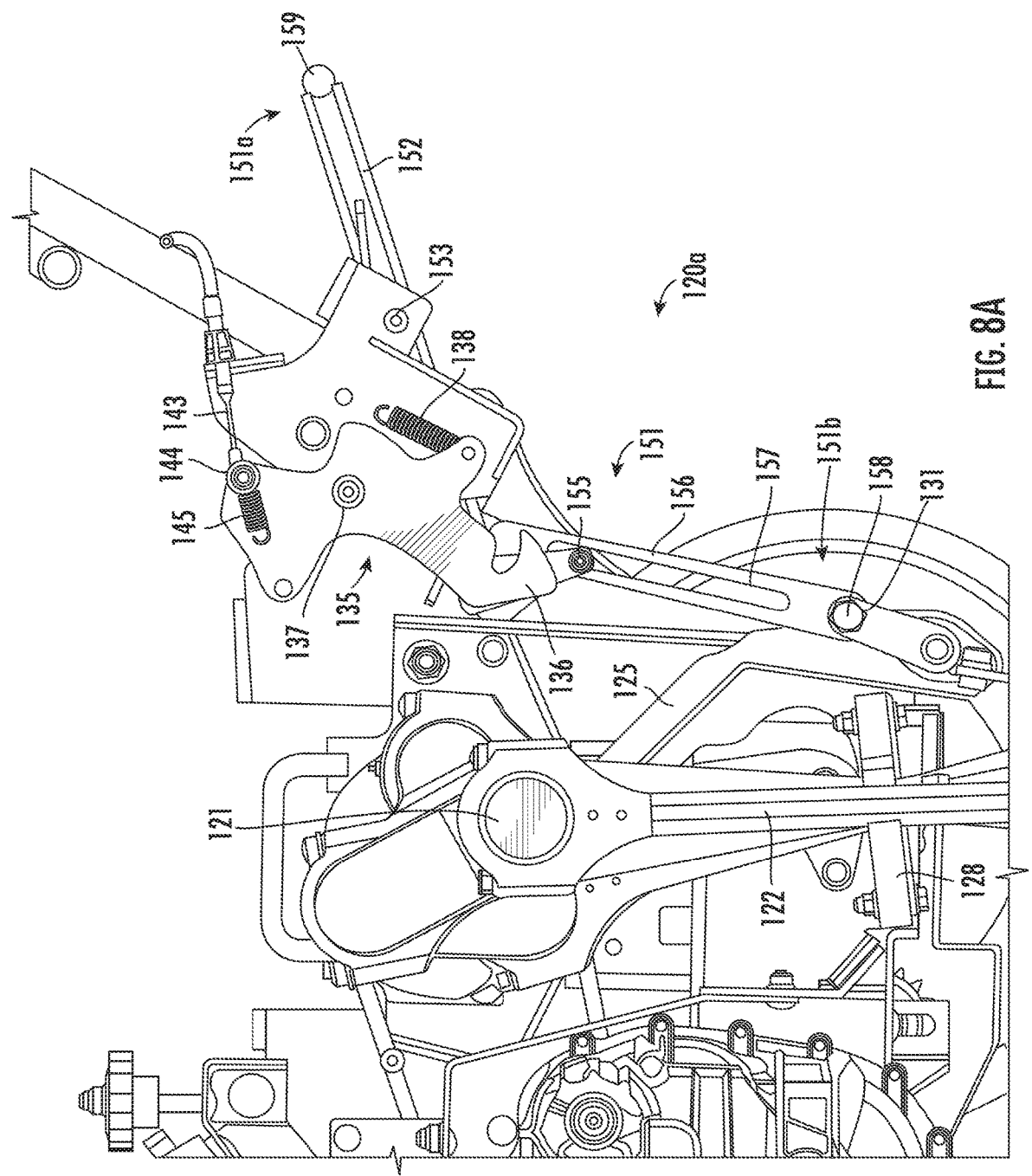
FIGS. 8A, 8B, and 8C are partial views of the aerator of FIG. 1, shown with the tine assembly at the operating position.
Figure 8B:
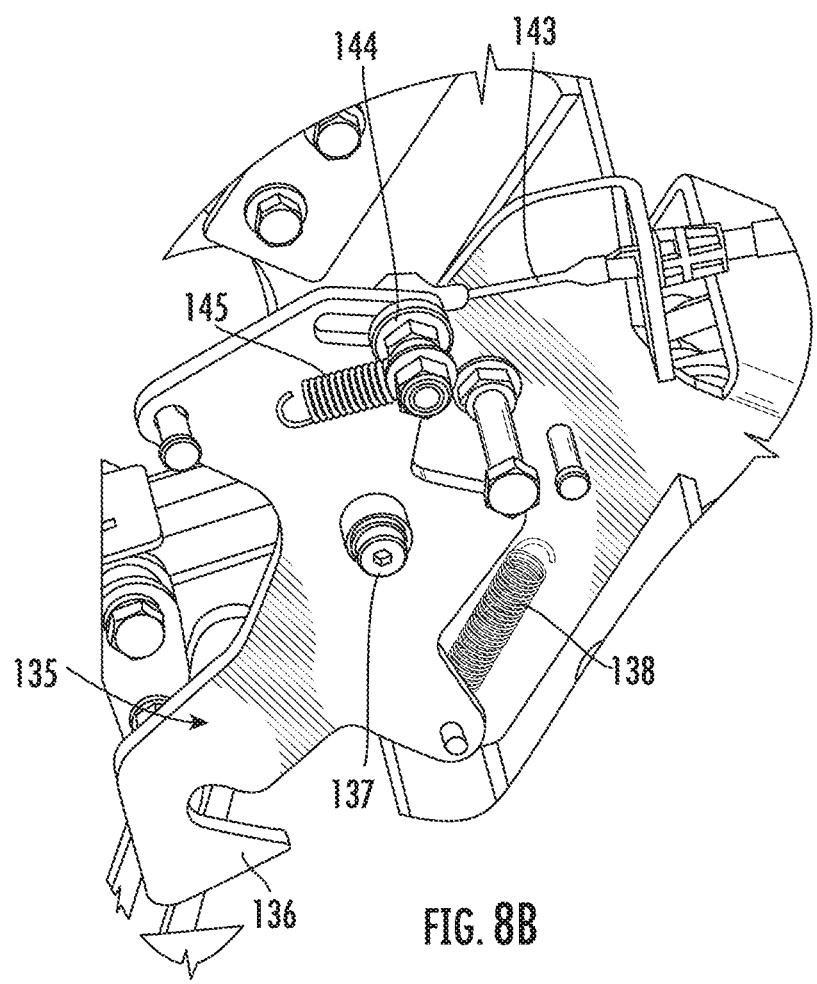
Figure 8C:
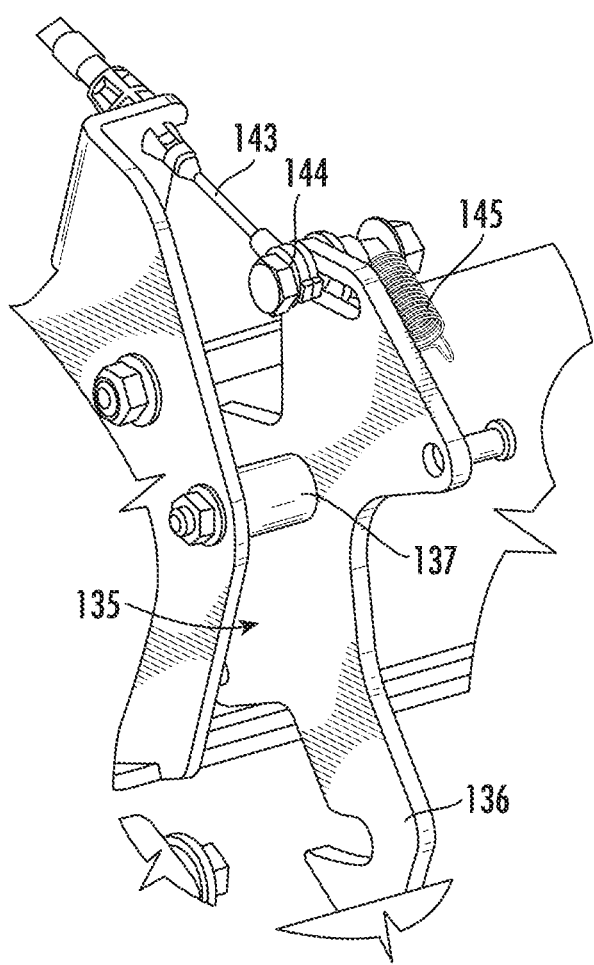

The linkage 151 is provided to move the tine assembly 120 from the operating position 120a to the retracted position 120b. One end 151a of the linkage 151 terminates at the input mechanism or pedal 159, and another end 151b of the linkage 151 is directly or indirectly rotatably coupled to the swing arm 125 (in the embodiment 100, the end 151b is coupled to the keeper bar 131 and has an axis of rotation that is coaxial with the keeper bar 131; this arrangement may be particularly desirable). The pedal end 151a may be coupled to (e.g., through welding, bolts, or any other appropriate fastener) or form the pedal 159. While the linkage 151 may be configured in various ways, it may be particularly desirable for the linkage 151 to include a driving link 152 associated with the pedal end 151a and a driven link 156 operable by the driving link 152. The driving link 152 is rotatably coupled to the frame 110 at pivot point 153 (FIG. 8A), and a biasing member 154 (FIG. 6B) biases the driving link 152 such that the pedal 159 is typically raised. A distal end of the driving link 152 includes a pin or other sliding element 155 (FIG. 8A) for interacting with the driven link 156, and the driven link 156 includes a sliding slot 157 which interacts with the sliding element 155. The driven link 156 forms the link end 151b and is coupled to the keeper bar 131 about axis of rotation 158 (FIG. 8A).

In use, the tine assembly 120 may start at the retracted position 120b (FIGS. 1 through 5 and 7A through 7C), with the keeper bar 131 held by the latch 135 (FIGS. 7A through 7C). The aerator 100 may be easily transported when the tine assembly 120 is at the retracted position 120b, as the tines 122 cannot interact with the ground. When the operator desires to use the tines 122, the tine assembly 120 may be quickly moved to the operating position 120a by actuating the release handle 141. Actuation of the release handle 141 causes the cable 143 to move the striker 144, overcoming the force of the spring 145 and the spring 138 and rotating the latch 135 about the pivot point 137 to release the keeper bar 131 from the hook portion 136. With the keeper bar 131 released from the hook portion 136, gravity causes the retractor plate 128 to move to be relatively horizontal (and the swing arms 125 to rotate about the pivot points 126), such that the tine assembly 120 is at the operating position 120a.

Movement of the aerator 100 from the retracted position 120b to the operating position 120a occurs in a single motion by the operator and can be performed without starting or stopping the engine. Moving conventional aerators into an operating position may require three separate steps: (1) engaging the clutch mechanism, (2) moving a lever to lower the tines into an operating position, and (3) grabbing a forward direction control to operate the aerator in a forward direction. While performing these steps, an operator must know the sequence in which to perform the steps and must perform the steps relatively quickly. On the contrary, the aerator 100 described herein allows for a single, fluid motion to move the tine assembly 120 into an operating position 120a. Accordingly, the operator does not need to know a certain sequence for performing the steps and does not need to try to perform three different movements in a quick sequence. Instead, using only one hand, the operator can actuate the release handle 141 to move the aerator 100 into the operating position 120a as described above.

To return the tine assembly 120 to the retracted position 120b, an operator steps upon the pedal 159 and rotates the driving link 152 (e.g., steel linkage) about the pivot point 153. Rotation of the driving link 152 causes the sliding element 155 to move along the sliding slot 157, ultimately raising the linkage end 151b (and rotating the swing arm 125) and positioning the keeper bar 131 to be held by the latch 135. Rotation of the swing arm 125 rotates the retractor plate 128, forcing the tines 122 to be pointed such that they cannot intersect the ground. In some embodiments, the input mechanism or pedal 159 can be a hand lever that is operable using a single hand.

In operation, the pedal 159 is operated solely through a stepping movement such that the operator does not need to use either of his or her hands to operate the pedal 159 to return the tine assembly 120 to the retracted position 120b. In this way, the operator's hands are free to remain engaged with the handles of the aerator 100 during movement from the operating position 120a to the retracted position 120b. Accordingly, the operator can focus on safely and effectively maneuvering the aerator 100 during operation. In addition, in situations where the operator may be new to operating the aerator 100, the operator does not need to worry about taking his or her hands off of the aerator 100 during operation and can learn to operate the hydro-static drive capabilities of the aerator 100. Conventional aerators may also use a flexible cable linkage to lift a tine assembly out of operation. In contrast, the aerator 100 uses a solid (e.g., steel) linkage to move the tine assembly 120 into the retracted position 120b. As such, the likelihood of a breakage in the linkage, or that the linkage may be snagged on other portions of the aerator 100 or by an operator, is reduced.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

Unless described differently above, the terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. It may be possible for various steps in described methods to be undertaken simultaneously or in other orders than specifically provided.

What is claimed is:

1. A turf aerator, comprising:
a frame;
a tine crank rotatably supported by the frame;
a plurality of tines coupled to the tine crank;
a swing arm rotatably supported by the frame;
a retractor plate fixed to the swing arm, the tines passing through openings in the retractor plate;
a linkage for selectively moving the retractor plate from an operating position to a retracted position, a first end of the linkage terminating at a pedal;
a keeper bar fixed to the swing arm;

a latch for engaging the keeper bar when the retractor plate is at the retracted position, the latch being rotatably supported by the frame; and an input for selectively rotating the latch to disengage the keeper bar, thereby allowing the retractor plate to move from the retracted position to the operating position.

2. The turf aerator of claim 1, wherein the keeper bar is indirectly fixed to the swing arm.

3. The turf aerator of claim 1, wherein a second end of the linkage is rotatably coupled to the swing arm.

4. The turf aerator of claim 1, wherein a second end of the linkage is indirectly rotatably coupled to the swing arm.

5. The turf aerator of claim 1, wherein a second end of the linkage has an axis of rotation that is coaxial with an axis of the keeper bar.

6. The turf aerator of claim 1, wherein the linkage includes a driving link and a driven link operable by the driving link, the driving link defining the linkage first end, the driven link having a sliding slot, a distal end of the driving link having a sliding element passing through the sliding slot and interacting with the driven link.

7. The turf aerator of claim 6, wherein the driven link has an axis of rotation that is coaxial with an axis of the keeper bar.

8. The turf aerator of claim 1, wherein the input includes a cable and a release handle.

9. A turf aerator, comprising:
a frame;
a tine crank rotatably supported by the frame;
a plurality of tines coupled to the tine crank;
a pair of swing arms rotatably supported by the frame;
a retractor plate fixed to the pair of swing arms, the tines passing through openings in the retractor plate;
a linkage for selectively moving the retractor plate from an operating position to a retracted position, a first end of the linkage terminating at a pedal;
a keeper bar fixed to the pair of swing arms;
a latch for engaging the keeper bar when the retractor plate is at the retracted position, the latch being rotatably supported by the frame; and
a cable for selectively rotating the latch to disengage the keeper bar, thereby allowing the retractor plate to move from the retracted position to the operating position, the cable being operable by a release handle.

10. The turf aerator of claim 9, wherein the linkage includes a driving link and a driven link operable by the driving link, the driving link defining the linkage first end, the driven link having a sliding slot, a distal end of the driving link having a sliding element passing through the sliding slot and interacting with the driven link.

11. The turf aerator of claim 10, wherein the driven link has an axis of rotation that is coaxial with an axis of the keeper bar.

12. The turf aerator of claim 9, further comprising a shield rotatably coupled to the swing arms for providing a buffer between the tines and an operator when the retractor plate is at the operating position.

* * * * *